UNITED STATES PATENT OFFICE.

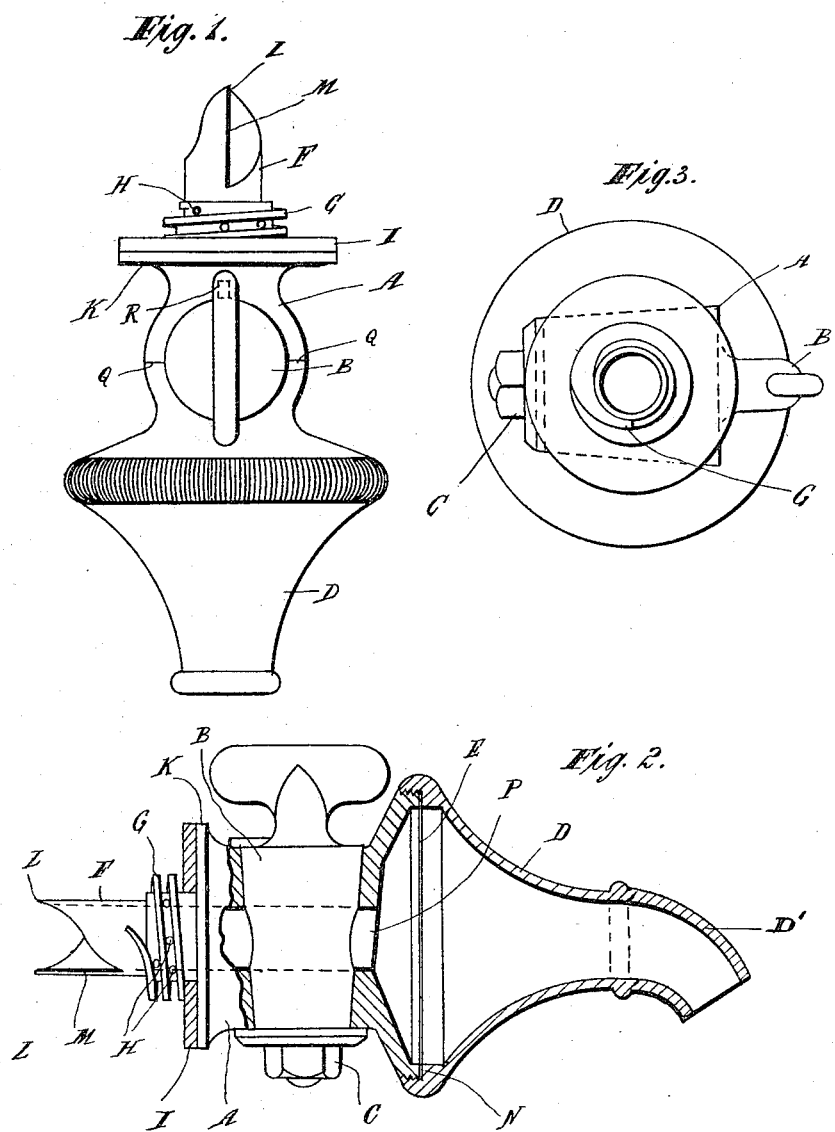
A. HOUSTON.
DEVICE FOR DRAWING OFF LIQUIDS FROM CONTAINERS.
APPLICATION FILED AUG. 5, 1916.
1,209,438.
Patented Dec. 19, 1916.
INVENTOR:
AUBREY HOUSTON
BY: *Ivan Oldenneel*
ATTORNEY.

AUBREY HOUSTON, OF CHRISTCHURCH, NEW ZEALAND.

DEVICE FOR DRAWING OFF LIQUIDS FROM CONTAINERS.

1,209,438.  Specification of Letters Patent.  Patented Dec. 19, 1916.

Application filed August 5, 1916. Serial No. 113,322.

*To all whom it may concern:*

Be it known that I, AUBREY HOUSTON, a subject of the King of Great Britain and Ireland, residing in Christchurch, New Zealand, have invented a new and useful Improvement in Devices for Drawing Off Liquids from Containers; and I do hereby declare the following to be a full, clear, and exact description of the same.

This invention relates to that class of apparatus for drawing off liquid from containers but more particularly benzin, kerosene and the like containers.

The object of the invention is to provide in a compact form a device having a piercer, strainer chamber and controlling tap.

According to this invention a tubular member having a shoulder thereon is provided with a double piercing and cutting edge formed upon its shoulder end. A screw thread is formed between the shoulder and the cutting edges to retain the device in position. The other or delivery end of the member is provided with a strainer and suitably shaped delivery end. Located between the delivery end and the shoulder is a tap of any suitable form.

The piercer is preferably formed with parallel cutting edges the points and the edges being sharpened in order to enable the metal of the container to be easily pierced and cut.

At a position near the shoulder orifices are provided in the piercer in order to enable the whole of the contents of the container to be delivered through the device. The delivery end of the member opens out conically to form a straining chamber and is provided with a gauze or the like strainer. A suitable delivery cap is threaded over the conical end and serves the dual purpose of retaining the strainer in position and forming a delivery end for the contents of the container.

The invention will now be described in detail with the aid of the accompanying drawings and the novel features pointed out in the claims.

On the drawings: Figure 1 is a plan of the device. Fig. 2 is a side view thereof partly in section. Fig. 3 is an end view of the device.

Referring to the drawings a tubular member A has a shoulder K and a piercer end F provided with piercing points L and cutting edges M shaped as shown. The edges J may also be sharp for the purpose of facilitating the piercing and cutting of the metal. A screw thread G preferably of the shape illustrated passes around the piercer end F. Resting against the shoulder K is a leather or the like washer I. The other end of the member A forms the delivery end of the device and is widened out in a conical manner and has a delivery cap D threaded upon it as shown. A strainer E of wire gauze is located in the straining chamber thus formed and is secured in position between the conical end and the shoulder N of the cap D. The delivery end of the cap is narrowed as shown for the purpose of entering the reservoir of motor tanks. By having the strainer of fairly large area a larger straining surface is obtained and less resistance is given to the flow of liquid from the container and further prevents the strainer becoming quickly choked.

Located in the member A is a tap or cock B retained in position by a nut C. The plug of this tap controls the passage P leading from the piercer point to the straining chamber. A pin R projecting from the plug B engages against the shoulders Q when in a closed position.

In operation the piercer points L are pressed through the metal of the container. The device is then rotated in order that the cutting edges M will cut a circular opening in the metal and the device is further rotated until the thread G engages the metal of the container and a liquid tight joint is formed between the metal and the washer I. The container may then be placed in the desired position and the tap B turned on to enable the contents to flow through the passage P and into the straining chamber.

Orifices H are provided through the piercer as shown in a position near the shoulder K in order to insure the whole of the contents of the container being delivered from the container into the passage P.

The delivery end of the cap D may if desired, be curved as shown at D' in Fig. 2 or lengthened in any desired manner.

What I claim is:—

1. In a device of the kind described, the combination of a tubular piercer provided with a pair of diametrically opposite piercing points together providing a pair of parallel longitudinal edges adapted to cut in the direction of the plane of the sheet of material to be cut and in the same direction of rotation when the tubular piercer is rotated, each point being also provided with a spiral edge adapted, when the piercer is forced into said material, to aid in giving the piercer a rotary motion, whereby a hole for the piercer is easily cut; means for retaining the piercer in said hole; and a cock connected to the piercer.

2. In a device of the class described, in combination, a piercer point comprising a tubular cylinder open and free from obstructions throughout and provided with diametrically opposite piercing points together providing a pair of parallel longitudinal cutting edges and a pair of spiral edges extending from one longitudinal edge to the other, a straining chamber, a passage through said piercer point to said straining chamber, a tap or cock controlling said passage and means for retaining said device in a position upon and liquid tight with a container, substantially as set forth.

3. In a device of the class described, in combination, a piercer point comprising a tubular cylinder open and free from obstructions throughout and provided with diametrically opposite piercing points together providing a pair of parallel longitudinal cutting edges and a pair of spiral edges extending from one longitudinal edge to the other, a passage leading from said piercer point to a straining chamber, a tap controlling said passage, a screw thread upon said piercer point whereby the device may be retained in position upon the container, and means for making a liquid tight joint with the container, substantially as set forth.

4. In a device for the purpose indicated, in combination, a piercer point comprising a tubular cylinder open and free from obstructions throughout and provided with diametrically opposite piercing points together providing a pair of parallel longitudinal cutting edges and a pair of spiral edges extending from one longitudinal edge to the other, a strainer chamber connected to the passage through said piercer point to said straining chamber, a tap controlling said passage and means for retaining said device in a position upon and liquid tight with the container, substantially as set forth.

5. In a device of the class described, the combination, of a piercer point comprising a tubular cylinder open and free from obstructions throughout and provided with diametrically opposite piercing points together providing a pair of parallel longitudinal cutting edges and a pair of spiral edges extending from one longitudinal edge to the other, said piercer point being connected to a straining chamber, a tap controlling said passage, a screw thread upon the neck of said piercer whereby the device may be retained in position upon the container, and means for making a liquid tight joint with the wall of the container, substantially as set forth.

6. In a device of the class described, in combination, a piercer point comprising a tubular cylinder open and free from obstructions throughout and provided with diametrically opposite piercing points together providing a pair of parallel longitudinal cutting edges and a pair of spiral edges extending from one longitudinal edge to the other, a passage leading from said piercer point, a tap controlling said passage, the delivery end of the device having a conical enlargement, a strainer located at the base of such conical enlargement, and a delivery cap fitted thereto, substantially as set forth.

7. In a device for drawing off liquids from containers having in combination, a tubular member, a tap controlling the passage in said tubular member, a piercer at one end of said member and comprising a tubular cylinder open and free from obstructions throughout and provided with diametrically opposite piercing points together providing a pair of parallel longitudinal cutting edges and a pair of spiral edges extending from one longitudinal edge to the other, a screw thread around the neck of said piercer, a washer between the shoulder and the exterior wall of the container, whereby a liquid tight joint is obtained between the wall of the container and the said shoulder by means of the said screw thread, a conical shaped straining chamber, the base of said chamber having a relatively large area, a strainer located at the base of said chamber and a delivery cap fitted to said chamber, substantially as set forth.

8. In a container of the class described, in combination, a tubular member, a shoulder to said member, a piercer projecting from said shoulder and comprising a tubular cylinder open and free from obstructions throughout and provided with diametrically opposite piercing points together providing a pair of parallel longitudinal cutting edges and a pair of spiral edges extending from one longitudinal edge to the other, a screw thread encircling the neck of said piercer whereby the said shoulder is brought to bear tightly upon the wall of the container, a washer between said shoulder and the metal of the container, an orifice or orifices in the neck of said piercer point at a position which will be just within the wall of the container when said device is in position, a tap controlling the passage through said tubular member, a straining chamber, and a delivery nozzle upon said straining chamber, substantially as set forth.

9. In a device of the class described having in combination, a piercer point comprising a tubular cylinder open and free from obstructions throughout and provided with diametrically opposite piercing points together providing a pair of parallel longitudinal cutting edges and a pair of spiral edges extending from one longitudinal edge to the other, a passage leading from said piercer point to a straining chamber, said straining chamber having a relatively large base or opening, a cap fitting said chamber and forming the delivery nozzle for the device, a tap controlling the passage from the piercer to the straining chamber, a screw thread encircling said piercing point for retaining the device in position upon the container, and means for making a liquid tight joint with said container, substantially as set forth.

In testimony whereof, I have signed my name to this specification in the presence of two subscribing witnesses.

AUBREY HOUSTON.

Witnesses:
SYDNEY H. HIGGS,
NORA MUIR.

Copies of this patent may be obtained for five cents each, by addressing the "Commissioner of Patents, Washington, D. C."